United States Patent
Kuehn et al.

(12)

(10) Patent No.: US 6,451,900 B1
(45) Date of Patent: Sep. 17, 2002

(54) REDISPERSIBLE POLYMER POWDERS

(75) Inventors: Hartmut Kuehn; Bernd Rothenhaeusser, both of Halle; Volker Kiesel, Lieskau; Andreas Wichmann, Schkopau, all of (DE)

(73) Assignee: Buna Sow Leuna Olefinverbund GmbH, Midland, MI (US)

( * ) Notice: Subject to any disclaimer, the term of this patent is extended or adjusted under 35 U.S.C. 154(b) by 0 days.

(21) Appl. No.: 09/581,736

(22) PCT Filed: Dec. 8, 1998

(86) PCT No.: PCT/DE98/03602

§ 371 (c)(1),
(2), (4) Date: Aug. 10, 2000

(87) PCT Pub. No.: WO99/32541

PCT Pub. Date: Jul. 1, 1999

(30) Foreign Application Priority Data

Dec. 18, 1997 (DE) .......................... 197 56 474

(51) Int. Cl.[7] .................................. C08J 3/02
(52) U.S. Cl. .................. 524/502; 525/221; 525/197; 526/317.1
(58) Field of Search .......................... 524/502; 525/221, 525/197; 526/317.1

(56) References Cited

U.S. PATENT DOCUMENTS

| 4,892,910 | A | 1/1990 | Klesse et al. |
| 5,342,897 | A | 8/1994 | Franzman et al. |
| 5,703,156 | A | 12/1997 | Sauer |
| 5,872,189 | A | 2/1999 | Bett et al. |

FOREIGN PATENT DOCUMENTS

| DE | 40 21 216 A1 | 9/1992 |
| EP | 0 134 451 | 1/1989 |
| EP | 0 522 791 B1 | 6/1996 |
| EP | 0 671 435 B1 | 7/1999 |

Primary Examiner—David W. Wu
Assistant Examiner—William K Cheung

(57) ABSTRACT

The invention concerns redispersible polymer powders which can be used in a variety of ways, for example, in hydraulically binding systems, but also as binder in greatly varied applications and which can be produced by spray-drying of aqueous dispersions. The sprayable aqueous dispersions are prepared by mixing an aqueous polymer dispersion 1 (containing polymer I) with an aqueous polymer dispersion 2 (containing polymer II) where the diameters of the particles of polymer I are greater by a factor of 5 to 150, preferably 15 to 50, than the diameter of the particles of polymer II, and polymer I is a polymer which forms films at room temperature, while polymer II has a glass transition temperature which is higher than that of polymer I, is insoluble in water and thus it is present in the undissolved form in the aqueous dispersion to be sprayed. The polymer powders according to the invention excel by a clearly improved resistance to blocking and very good storage stability.

4 Claims, No Drawings

REDISPERSIBLE POLYMER POWDERS

The present invention concerns redispersible polymer powders, which excel especially by good storage stability and can be used in many ways, for example, in hydraulically binding systems, but also as a binder in the most varied applications, and can be prepared by spray-drying of aqueous dispersions.

The use of polymer powders as additive, especially for hydraulically binding systems or as binder in coating compositions is generally known. Such additives improve the application properties of the systems in which they are used. Thus, when used in hydraulically binding compositions, the bending and tensile strength of construction materials to which they are added, are improved. Moreover, they have an improving influence on the processability of the construction materials.

The production of such powders is known and, for example, is described in the following patents:

In EP 0134451, the use of various naturally occurring water-soluble substances, such as starches, starch derivatives, proteins and/or water-soluble polymers are named as spray additives in the preparation of redispersible dispersion powders.

DE-OS 4021216 describes the preparation of a polymer powder, where a film-forming dispersion polymer is sprayed with an completely or partially neutralized water-soluble copolymer consisting of 50 to 80 weight % of unsaturated carboxylic acids and an alkene and/or styrene as spray additive. According to EP 0 671 435, aqueous protective-colloid-containing acrylate dispersions can be sprayed to powder redispersible binders using 0.01 to 30 weight % of water-soluble or water-dispersible resins, which consist of 30 to 50 weight % of hydrophilic, water-soluble and salt-forming monomers and 50–70 weight % of hydrophobic, essentially water-insoluble monomers. In EP 0522791, the preparation of powders by spraying of core-shell products is described, where an alkali-insoluble core is surrounded by an alkali-soluble shell. The core-shell dispersion is sprayed after neutralization with an amine or a base.

All the redispersible powders named above are based on a uniform basic principle of preparation: To the polymer to be sprayed, a spraying aid is added, which is first in the dissolved form at the beginning of the spray-drying process and deposits on the particles to be sprayed during drying, as a "protective shield". The spraying aid has a great influence on the properties of the powder. First of all, it should provide as good a redispersibility to the polymer powder as possible, and, on the other hand, together with the commonly used antiblocking agent, should prevent blocking of the powder during storage. Moreover, the spraying aid should not have an adverse influence on the application-technological properties of the polymer to be sprayed, but should influence these as advantageously as possible.

The task of the present invention was to prepare a redispersible polymer powder which is characterized, in contrast to the above, by the fact that, with the same amount of spraying aid (weight %, based on the polymer to be sprayed), a clearly improved resistance to blocking is achieved. Moreover, the preparation of the powder according to the invention should result in a simplification of the manufacturing technology.

In developing the solution, it was shown that good redispersible dispersion powders can be prepared not only in the usual way, by the use of a spraying aid present in the dissolved form, but that, surprisingly, this is possible even when using an additive that is not dissolved, when this has a particle size which is clearly smaller than the particle size of the dispersion to be sprayed.

This is achieved by redispersible polymer powders, prepared by spray-drying of an aqueous dispersion, which is obtained by mixing an aqueous polymer dispersion 1 (containing polymer I) with an aqueous polymer dispersion 2 (containing polymer II), where the diameter of the particles of polymer I is greater than the diameter of the particles of polymer II by a factor of 5 to 150, preferably 10 to 50, and polymer I is a polymer that forms films at room temperature, while polymer II has a glass-transition temperature which is higher than that of polymer I, is insoluble in water and thus it is present in the undissolved form in the aqueous dispersion to be sprayed.

The glass temperature of polymer II should be higher than the temperature at the exit of the spray dryer. The amount of polymer II, which is needed (weight % based on polymer I), in order to achieve a certain resistance to blocking, which becomes smaller as polymer I and polymer II differ more with regard to their particle size. The amount of polymer II which is used lies at 5 to 40 weight %, preferably 10 to 30 weight %. Before spraying the additive, surface-active substances can be added to the aqueous dispersion to improve the redispersibility.

Preferably, polymer II consists of 5 to 80 weight %, especially 20 to 50 weight % of a copolymerized, unsaturated carboxylic acid and is thus entirely or partially soluble in alkali, while the pH value of the aqueous dispersion to be sprayed is kept so low that polymer II is present in the undissolved form.

Advantageously, methacrylic acid or acrylic acid is used as the unsaturated carboxylic acid.

The spray drying of the aqueous dispersion is done in a commercial pilot plant spray dryer in cocurrent. Air is used as drying gas, which enters the dryer at a temperature of 115°C and leaves it at a temperature of 60°C. The dispersions I and II are always sprayed in as a mixture of dispersion through a two-material nozzle. The addition of antiblocking agents (ABM) is done through a second two-material nozzle also in cocurrent. The powder is deposited in a cyclone which is connected at the end.

In the examples given below, polymer dispersions with the following composition were used:

| Dispersion | | Particle size (TGv nm) |
|---|---|---|
| A | styrene/butyl acrylate/acrylamide (Tg according to Fox: 0°C) | 600 |
| B | styrene/butadiene (Tg according to Fox: 5°C) | 200 |
| C | methyl methacrylate/methacrylic acid (35 weight % methacrylic acid) | 25 |
| D | methyl methacrylate/methacrylic acid (35 weight % methacrylic acid) | 260 |
| E | styrene | 20 |
| F | styrene | 190 |

In Table 1, the Examples are characterized more closely and essential data are summarized about the properties of the polymer powders produced.

TABLE 1

| | aqueous dispersion | | | | | polymer powder | | | |
|---|---|---|---|---|---|---|---|---|---|
| Example | pH | polymer I | % | polymer II | % | sedim. 1/24 h (pH < 7) | sedim. 1/24 h (pH > 10) | ABM (%) | blocking resistance |
| 1 | <7 | A | 80 | C | 20 | 4/24 | 1/7 | 5 | 12 |
| 2 | <7 | A | 85 | C | 15 | 6/27 | 2/10 | 5 | 17 |
| 3 V | <7 | A | 80 | D | 20 | 9/38 | 7/27 | 5 | 30 |
| 4 V | >10 | A | 80 | C | 20 | | 2/8 | 5 | 36 |
| 5 | >7 | A | 80 | E | 20 | 5/17 | | 5 | 24 |
| 6 V | >7 | A | 80 | F | 20 | 25/46 | | 5 | 60 |
| 7 | >7 | B | 80 | E | 20 | 4/14 | | 5 | 20 |
| 8 V | >7 | B | 80 | F | 20 | 15/35 | | 5 | 50 |

V = Comparison Example

The addition of other additives (for example, surface-active substances) was done so that samples compared with one another always contained the same amount of them.

It can be seen in Table I that the ratio of the particle sizes of polymer I: polymer II has a decisive influence on the sedimentation and tendency to blocking (comparison of Example 1 with Example 3, comparison of Example 5 with Example 6 and comparison of Example 7 with Example 8). It can be seen that the examples prepared according to the invention show clearly better values, both with regard to sedimentation as well as resistance to blocking (see in this connection "Explanation of the methods of investigation").

Example 1 differs from Comparison Example 4 only in the fact that Example 4 was used at a pH >10 and thus polymer II was sprayed in the dissolved state. It was found that this made the resistance to blocking clearly worse.

The polymer powders from Example I and from Example 4 were added to a mixture of 78 weight % of standard sand and 22 weight % of cement (32.5) and a mortar was prepared from this (plastic : cement ratio always 0.1, water: cement 0.45), which was then investigated according to EN 196.

It can be seen from Table 2 that the greatly improved resistance to blocking of the powder produced according to the invention is not reached at the expense of significant application-technological properties. Both the bending tensile strength, as well as the compressive strength of the produced concrete show better values when prepared with the addition of the powder according to Example 1.

TABLE 2

| Example | extent of expansion (mm) | density prisms (g/cm$^3$) | bending tensile strength (N/mm$^2$), 14 days | compressive strength (N/mm$^2$), 14 days |
|---|---|---|---|---|
| 1 | 148 | 2.11 | 7.4 | 37 |
| 4 V | 152 | 2.12 | 6.9 | 33 |

Explanation of the Methods of Investigation:

Blocking test: First, a tablet is formed from the powder and a weight is made to act on a stamp, which is loaded onto the powder in a metal cylinder of 50 mm diameter for 24 hours. A load is chosen which is greater than occurs approximately during storage in pallets, in order to make tabletting possible, even in the case of powders which show hardly any tendency to blocking, so that this method can also be used in the comparison with powders having very good blocking behavior.

The obtained tablet is introduced in the horizontal position into a hollow cylinder rotating along its longitudinal axis, the surface of which is covered with sieving fabric. The cylinder turns at a velocity of 40 rpm, and the weight of the powder falling through the sieving fabric is determined. The time is determined within which 50% of the weight of the tablet went through the sieve. The shorter this time, the lower the tendency of the powder to blocking. Under the selected conditions, commercial powders reach values of 10 to 20 seconds.

Sedimentation: This value yields information about the redispersibility of the investigated powder.

For this purpose, the powder is redispersed in water at a ratio of 1:1 and then diluted, 50 g of the 5% redispersions are filled into calibrated tubes and after 1 hour and 24 hours, the height of the sedimented layer is measured; the lower the obtained values the better is the redispersibility of the powder.

In Table 1, in the case of using alkali-soluble polymers, in addition, the sedimentation of the redispersion prepared at pH>10 is determined, since this comes closer to the conditions when using the powder in the mortar.

Under the selected redispersion conditions, commercial powders show values of approximately 2 and 8–10 mm.

What is claimed is:

1. Redispersible polymer powder prepared by spray-drying of an aqueous dispersion, wherein this dispersion is obtained by mixing an aqueous polymer dispersion I (containing polymer I) with an aqueous polymer dispersion 2 (containing polymer II) where the diameters of the particles of polymer I are greater by a factor of 5 to 150 than the diameters of the particles of polymer II and polymer I is a polymer which forms a film at room temperature, while polymer II has a glass transition temperature higher than polymer I, is insoluble in water and thus is present in the undissolved form in the aqueous dispersion to be sprayed and is used in an amount of 5 to 40 weight %, based on the total weight of polymer I and polymer II.

2. Redispersible polymer powder according to claim 1, wherein polymer II contains 5 to 80 weight %, preferably 20 to 50 weight % of copolymerized unsaturated carboxylic acids, so that it is entirely or partially soluble in alkali, but the pH value of the aqueous dispersion to be sprayed is kept so low that polymer II is present in the water-insoluble form and that methacrylic acid or acrylic acid are used as the unsaturated carboxylic acids.

3. Redispersible polymer powder according to claims 1 and 2, wherein the diameter of the particles of polymer I are greater by a factor of 10 to 50 than the diameters of the particles of polymer II.

4. Redispersible polymer powder according to claims 1 to 3, wherein the polymer II is present in a weight of 10 to 30 weight % based on the total weight of polymer I and polymer II.

* * * * *